US009014401B2

(12) United States Patent
Fujita

(10) Patent No.: US 9,014,401 B2
(45) Date of Patent: Apr. 21, 2015

(54) MIXING APPARATUS

(75) Inventor: Hiroaki Fujita, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 733 days.

(21) Appl. No.: 13/047,653

(22) Filed: Mar. 14, 2011

(65) Prior Publication Data

US 2011/0228955 A1 Sep. 22, 2011

(30) Foreign Application Priority Data

Mar. 19, 2010 (JP) ................................. 2010-065105

(51) Int. Cl.
*H04B 1/00* (2006.01)
*H04H 60/04* (2008.01)

(52) U.S. Cl.
CPC .................................... *H04H 60/04* (2013.01)

(58) Field of Classification Search
CPC ............ H04S 3/00; H04S 5/005; H04S 7/30; H04S 2400/13; H04R 27/00; H04H 60/04; G10H 2250/041
USPC ........... 381/61, 98–109, 119; 700/94; 84/625, 84/660; 369/4
See application file for complete search history.

(56) References Cited

U.S. PATENT DOCUMENTS 7,395,127 B2 * 7/2008 Terada et al. ................ 381/119
7,515,722 B2 * 4/2009 Aiso et al. .................... 381/119
7,532,731 B2 * 5/2009 Aiso et al. .................... 381/119
7,613,530 B2 * 11/2009 Aiso et al. ...................... 700/94
7,657,040 B2 * 2/2010 Aiso et al. .................... 381/119
8,073,159 B2 * 12/2011 Ando ........................... 381/119
8,214,065 B2 * 7/2012 Aoki et al. ...................... 700/94
8,253,004 B2 * 8/2012 Homburg ........................ 84/610
8,315,727 B2 * 11/2012 Terada ......................... 381/119
8,526,639 B2 * 9/2013 Terada et al. ................ 381/119
2007/0025568 A1 2/2007 Aiso et al.
2007/0061729 A1 3/2007 Terada
2012/0243711 A1 * 9/2012 Fujita et al. .................. 381/119

FOREIGN PATENT DOCUMENTS

JP 2006-253892 A 9/2006

OTHER PUBLICATIONS

European Search Report mailed Oct. 2, 2012, for EP Application No. 11158589.9, eight pages.

* cited by examiner

*Primary Examiner* — Xu Mei
(74) *Attorney, Agent, or Firm* — Morrison & Foerster LLP

(57) ABSTRACT

Once a human operator selects one output channel using a port setting key and SEL key, output port parameters of a plurality of output ports connected with the selected output channel are displayed in a given arrangement on an output channel-port setting popup screen, and the thus-displayed output port parameters are allocated to controls of corresponding channel strips. Such arrangements allow parameter setting operation to be readily performed for each of the output ports.

12 Claims, 6 Drawing Sheets

MIXING APPARATUS

BACKGROUND

The present invention relates to digital mixers which perform signal processing on audio signals of a plurality of channels and output the processed audio signals, and more particularly to a technique for setting output ports that function as signal destinations of output channels.

Digital audio mixers (hereinafter referred to as "digital mixers" or "mixers") include an output patch section which allocates output destinations to individual output channels. By the output patch section, an output signal of an output channel can be output via desired one or more output ports connected with the output channel. The term "patch" used herein refers to allocating output destinations to input sources of audio signals. Among the conventionally-known digital mixers are ones where parameters, such as sound volume level and delay parameters, are controllable for each of output ports connected to output channels. Such sound volume level and delay parameters are used for adjustment of sound volume level and propagation time differences in audio signal among a multiplicity of output ports. One example of such digital mixers is disclosed in Japanese Patent Application Laid-open Publication No. 2006-253982.

When a parameter pertaining to an output port, to which an output signal of a given output channel is being supplied, is to be controlled, the conventionally-known digital mixer requires a human operator to designate an output port connected to the given output channel from among a plurality of output ports provided in the mixer and then perform setting of parameters pertaining to the designated output port. The conventionally-known digital mixer constructed in this manner would present the inconvenience that the parameter setting operation for each of the output ports is cumbersome and complicated and thus leads to a poor operability of the mixer. In particular, when parameters are to be controlled for a plurality of the output ports connected to a same output channel, such an inconvenience would become noticeable.

SUMMARY OF THE INVENTION

In view of the foregoing, it is an object of the present invention to provide an improved digital mixer which can facilitate parameter setting operation for each of one or a plurality of output ports connected to a given output channel.

In order to accomplish the above-mentioned object, the present invention provides an improved digital mixer including a plurality of output channels, a plurality of output ports and an output patch section, which mixer comprises: a storage section which stores a plurality of parameters including first parameters of individual ones of the output channels, second parameters of the output patch section and third parameters of individual ones of the output ports; a connection change section which changes any of the second parameters, stored in the storage section, in response to connection change operation by a human operator; a display device; a plurality n of controls; an output channel selection section which, in response to output channel selection operation by the human operator, selects any one of the plurality of output channels; a parameter allocation section which, once any one of the output channels is selected by the output channel selection section, not only detects one or more of the output ports connected to the one output channel on the basis of the second parameters and displays on the display device output port information indicative of the detected one or more output ports, but also allocates one or more of the third parameters of the detected one or more output ports to the n controls; a parameter change section which, in response to operation by the human operator of any one of the n controls, changes a value of the third parameter allocated to the one control by the parameter allocation section from among the plurality of parameters stored in the storage section; the plurality of output channels, each of which inputs a supplied audio signal, controls a characteristic of the inputted audio signal on the basis of the first parameter stored in the storage section and outputs the controlled audio signal; the output patch section which, in accordance with connections between the plurality of output channels and the plurality of output ports indicated by the second parameters stored in the storage section, supplies an audio signal, outputted from each of the output channels, to one or more of the output ports connected with the output channel; and the plurality of output ports, each of which inputs a supplied audio signal, controls a characteristic of the inputted audio signal on the basis of the third parameter stored in the storage section and outputs the controlled audio signal to outside the mixer.

According to the present invention, once the human operator selects a given one of the output channels, output port information, such as port names or port numbers, a plurality of output ports connected with the selected output channel are displayed on the display device, parameters (third parameters) of the individual output ports displayed on the display device are allocated to the plurality n of controls. Thus, by the human operator operating any one of the controls, any one of the parameters of each of the output ports can be changed, and an audio signal can be processed on the basis of the changed parameter. Such arrangements of the present invention advantageously allow the human operator to efficiently perform parameter setting operation for the plurality of output ports, which function as output destinations of a given output channel, using the plurality of controls.

According to another aspect of the present invention, there is provided an improved digital mixer including a plurality of output channels, a plurality of output ports and an output patch section, which comprises: a storage section which stores a plurality of parameters including first parameters of individual ones of the output channels, second parameters of the output patch section and third parameters of individual ones of the output ports; a connection change section which changes any of the second parameters, stored in the storage section, in response to connection change operation by a human operator; a display device; a plurality n of controls; a layer selection section which, in response to layer selection operation by the human operator, selects any one of a plurality of layers each comprising plural n output channels of the plurality of output channels; an output channel selection section which, in response to output channel selection operation by the human operator, selects any one of the plurality of output channels; a parameter allocation section which, once any one of the layers is selected by the layer selection section, not only displays on the display device output channel information indicative of the n output channels belonging to the one layer but also allocates n first parameters of the n output channels to the n controls, and which, once any one of the output channels is selected by the output channel selection section, not only detects one or more of the output ports connected to the one output channel on the basis of the second parameters and displays on the display device output port information indicative of the detected one or more output ports, but also allocates one or more of the third parameters of the detected one or more output ports to the n controls; a parameter change section which, in response to operation by the human operator of any one of the n controls, changes a value of the parameter allocated to the one control by the parameter allocation section from among the plurality of parameters stored in the storage section; the plurality of output channels, each of which inputs a supplied audio signal, controls a characteristic of the inputted audio signal on the basis of the first parameter stored in the storage section and outputs the controlled audio signal; the output patch section which, in accordance with connections between the plurality of output channels and the plurality of output ports indicated by the second parameters stored in the storage section, supplies an audio signal, outputted from each of the output channels, to one or more of the output ports connected with the output channel; and the plurality of output ports, each of which inputs a supplied audio signal, controls a characteristic of the inputted audio signal on the basis of the third parameter stored in the storage section and outputs the controlled audio signal to outside the mixer.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

<General Setup of Mixer>

Figure 1:
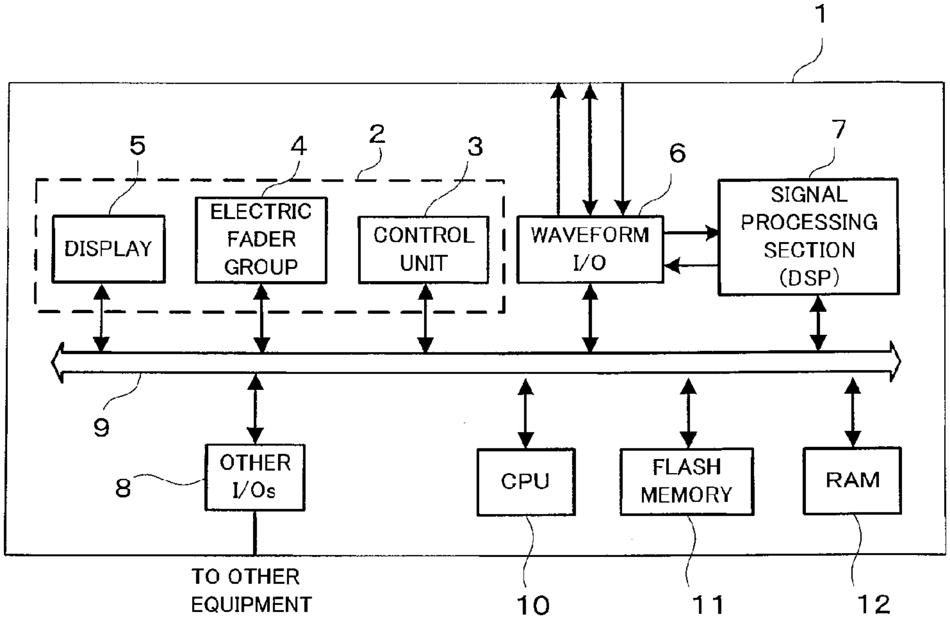
FIG. 1 is a block diagram showing a general electric hardware setup of a digital mixer of the present invention.

FIG. 1 is a block diagram showing a general electric hardware setup of a digital audio mixer of the present invention. The digital audio mixer (hereinafter referred to as "digital mixer" or "mixer") 1 includes a CPU (Central Processing Unit) 10, a flash memory 11, a RAM (Random Access Memory) 12, a control unit 3, an electric fader group 4, a display device 5, a waveform input/output interface (waveform I/O) 6, a signal processing section (DSP (Digital Signal Processing) section) 7 and other I/Os 8, and these components are interconnected via a bus 9.

The CPU 10 controls general behavior of the digital mixer 1 by executing control programs stored in the flash memory 11 or RAM 12. The flash memory 11 is a non-volatile memory storing therein various programs for execution by the CPU 10 and various data for reference by the CPU 10. The RAM 12 is a volatile memory for use as a loading area of a program to be executed by the CPU 10 and as a working area for the CPU 10. The flash memory 11 includes a current memory storing therein current values (current settings) of all parameters for use in signal processing. The current memory contains parameters of individual output channels (i.e., first parameters), parameters of an output patch section (i.e., second parameters), and parameters of individual output ports (i.e., third parameters).

The control unit 3, electric fader group 4 and display device 5 are user interfaces provided on an operation panel 2 of the mixer 1. The display device 5 is in the form of a touch-panel type display operable by a user or human operator to make inputs through touch operation on the display panel, and it can display various screens on the basis of display control signals given from the CPU 10 via the bus 9. The control unit 3 and electric fader group 4 comprise groups of controls provided on the operation panel. More specifically, the electric fader group 4 comprises fader-type controls which are operable by the human operator and whose operating positions can be automatically controlled on the basis of drive control signals given from the CPU 10. In response to operation of the control unit 3, electric fader group 4 and touch panel of the display device 5, the CPU 10 adjusts values of parameters. In this specification, operation for "adjusting (changing) a value of a parameter" means changing a value of the parameter, stored in the current memory, to a value corresponding to the operation and reflecting the changed value in the DSP section 7 and display device 5.

The waveform I/O 6, which is an interface for inputting and outputting audio signals, comprises a plurality of input ports for inputting analog and digital audio signals from external equipment, and a plurality of output ports for outputting analog and digital audio signals to external equipment, as indicated by arrows in the figure. The waveform I/O 6 also includes mechanisms for performing analog-to-digital (A/D) conversion, digital-to-analog (D/A) conversion and digital conversion (i.e., format conversion). Further, the mixer 1 is connectable with other equipment via the other interfaces 18.

The DSP section 7 performs digital signal processing on an audio signal input from external equipment via the waveform I/O 6 on the basis of values of various parameters stored in the current memory, by executing various microprograms on the basis of instructions given by the CPU 10. Then, the DSP section 7 outputs the thus-processed audio signal to external equipment via the waveform I/O 6. The signal processing performed by the DSP section 7 is various signal processing, such as mixing processing, effect impartment processing and sound characteristic (sound volume level and quality) control processing, etc. The DSP section 7 may include only one DSP (Digital Signal Processor), or a plurality of DSPs interconnected via a bus so that the signal processing can be performed distributedly by the plurality of DSPs.

The DSP section 7 also performs digital signal processing on a digital audio signal input via the waveform I/O 6 on the basis of settings of various parameters stored in the current memory provided in the flash memory 11, by executing various microprograms on the basis of instructions given by the CPU 10, and it outputs the thus-processed audio signal to the outside via the waveform I/O 6. The signal processing performed by the DSP section 7 includes sound characteristic adjustment processing for each of a plurality of logical signal processing channels, mixing processing for mixing signals of a plurality of channels, effect impartment processing, etc.

<Signal Processing Construction>

Figure 2:
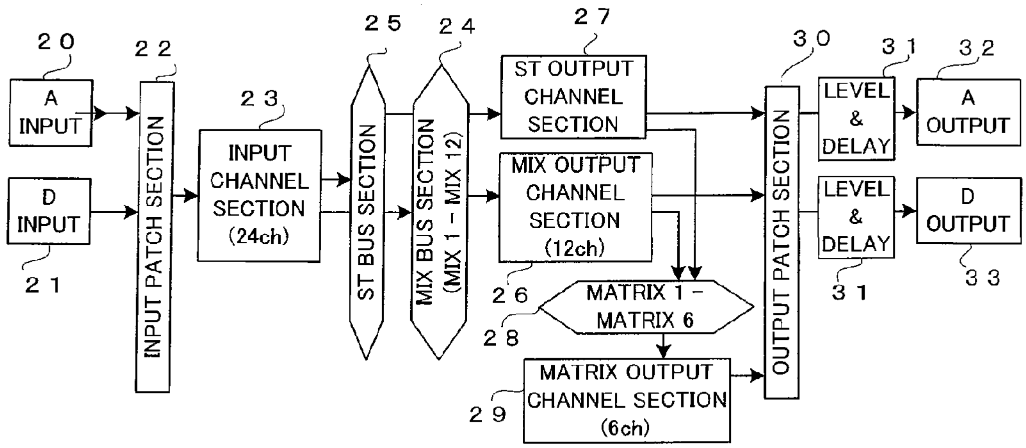
FIG. 2 is a block diagram explanatory of audio signal processing performed by the mixer of FIG. 1.

FIG. 2 is a block diagram explanatory of an example construction for audio signal processing performed by the waveform I/O 6 and DSP section 7 of FIG. 1. In FIG. 2, an analog input section ("A input") 20 and digital input section ("D input") 21 correspond to audio signal input functions (mainly, functions of A/D conversion, format conversion and the plurality of input ports) of the waveform I/O 6.

An input patch section 22 supplies an audio signal, input from each of the input ports, to one or more input channels connected to the input port in accordance with connections between the input channels and the input ports indicated by patch setting data of the input patch section stored in the current memory. In response to patch setting change operation by a human operator, the CPU 10 changes patch setting data of an input patch stored in the current memory. Thus, the human operator can designate connection between an input port and an input channel (i.e., allocation, to the input port, of the input channel). Only one input port is connectable to one input channel; that is, a plurality of input ports are not simultaneously connectable to one input channel.

As further shown in FIG. 2, an input channel section 23 comprises 24 (twenty-four) input channels. Each of the input channels of the input channel section 23 performs various signal processing, such as processing related to a head amp. gain, attenuator, delay, phase switch, equalizer (EQ), compressor, sound volume level control, channel ON/OFF, send (or delivery) level to a MIX bus section 24 provided at a succeeding stage and panning, on an audio signal input from an input port, allocated by the input patch section 22, on the basis of values of corresponding parameters stored in the current memory. The audio signal having been subjected to the signal processing is output to one or more buses of the MIX bus section 24 in accordance with bus send ON/OFF settings.

Each of twelve MIX buses of the MIX bus section 24 mixes together audio signals supplied from the input channel section 23 and outputs the mixed audio signal to a MIX output channel section 26 provided at a stage succeeding the MIX bus section 24. A stereo (ST) bus section 25 comprises a pair of left (L) and right (R) stereo buses, which performs mixing processing on audio signals supplied from the input channel section 23 and outputs the thus-mixed stereo signal to a stereo (ST) output channel section 27 provided at a stage succeeding the stereo bus section 25.

Figure 3:
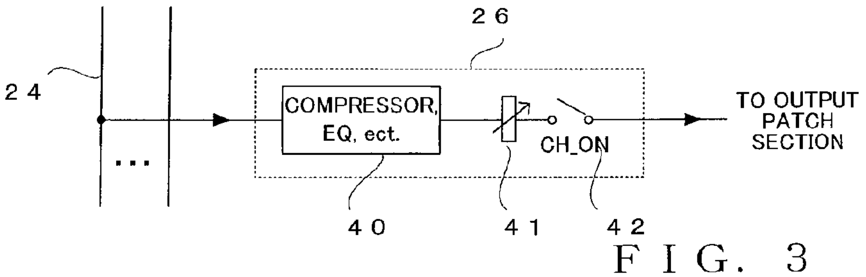
FIG. 3 is a block diagram explanatory of a signal processing construction of an output channel shown in FIG. 2.

The MIX output channel section 26 includes 12 (twelve) MIX output channels provided in corresponding relation to the 12 MIX buses. FIG. 3 shows an example construction of one MIX output channel 26. The MIX output channel 26, which is connected to a corresponding one of the MIX buses 24, includes: a sound characteristic adjusting parameter portion 40 including a compressor, an equalizer (EQ), etc., a sound volume fader 41 for controlling the sound volume of an input signal; and a channel ON/OFF portion 42 for setting a signal output ON or OFF state of the output channel 26. Each of the MIX output channels 26 performs various signal processing, such as equalizer (EQ), compressor, sound volume level control and channel ON/OFF processing, on an audio signal input from a corresponding one of the MIX buses 24 on the basis of values of corresponding ones of parameters of the individual output channels (i.e., first parameters) stored in the current memory. The audio signal having been subjected to such signal processing is output to an output patch section 30 provided at a stage succeeding the MIX output channel section 26.

The stereo (ST) output channel section 27 includes a pair of output channels corresponding to the stereo buses 25 and performs various signal processing, such as equalizer (EQ), compressor, sound volume level control and channel ON/OFF processing, on audio signals input from the corresponding stereo buses 25, on the basis of values of corresponding ones of the output-channel-specific parameters (first parameters) stored in the current memory. The audio signals having been subjected to such signal processing are output to the output patch section 30 provided at the stage succeeding the stereo output channel section 27.

Further, an output signal of each of the MIX output channels 26 and stereo output channels 27 can also be supplied to a desired one or more of six MATRIX buses 28 in accordance with matrix bus send ON/OFF settings of the output channel. Each of the MATRIX buses 28, each of which comprises six bus lines, mixes together one or more audio signals supplied from the MIX output channels or stereo output channels 27 and supplies a mixed audio signal (or mixed result) to a MATRIX output channel 29 corresponding to the MATRIX bus 28. The six MATRIX output channels 29 are signal processing channels to which are supplied output signals of the MATRIX buses 28 corresponding thereto, and the MATRIX output channels 29 each have a construction and function similar to those of the MIX output channel 26 shown in FIG. 3. An output signal of each of the MATRIX output channels 29 is output to the output patch section 30.

The output patch section 30 supplies the audio signal, output from each of the MIX output channels 26, stereo output channels 27 and MATRIX output channels 29, to one or more output ports connected therewith in accordance with connections between output channels and output ports indicated by output patch setting data (i.e., second parameters of the patch section 30) stored in the current memory. The human operator can perform operation for connecting the output channels to the individual output ports (connection change operation) via the control unit 3 and an output patch setting screen (connection change section) displayed on the display device 5. In response to connection change operation by the human operator, the CPU 10 changes the output patch setting data (second parameters) stored in the current memory. In this way, the human operator can designate connections between the output channels and the output ports. Note that only one output channel is connectable to each of the output ports and a plurality of the output channels are not simultaneously connectable to one output port.

Output port parameters 31 (i.e., third parameters of the output ports) are parameters for processing an output signal for each of the output ports (i.e., parameters for performing sound volume level control and delay control), which are implemented by signal processing performed by the DSP section 7. An output signal of each of the output channels is output, from the output port connected therewith by the output patch section 30, after being subjected to the sound volume level control and delay control corresponding to the output port parameters 31. An "A output" section 32 and "D output" section 33 correspond to audio signal output functions (mainly, D/A conversion, format conversion and a plurality of output ports) of the waveform I/O 6.

<Signal processing Construction of Output Patch and Output Port>

Figure 4:
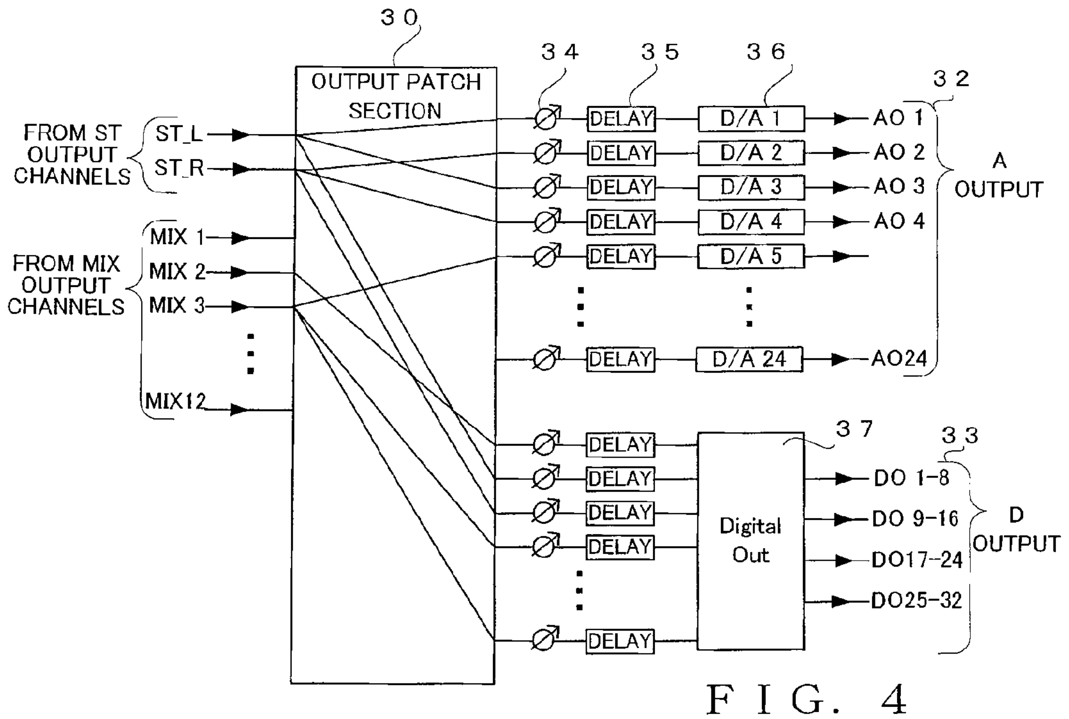
FIG. 4 is a block diagram explanatory of signal processing constructions of an output patch section and output ports.

In FIG. 4, "MIX1"-"MIX12" indicate output signals from twelve MIX output channels, and "ST_L" and "ST_R" indicate output signals from the L (left) and R (right) channels of the stereo output channel section 27. "Ao1"-"Ao24" indicate 24 (twenty-four) analog output ports provided as the "A output" section 32, and "Do1-8"-"Do25-32" indicate 32 (thirty-two) digital output ports provided as the "D output" 33. One digital output port terminal is constructed to be capable of outputting signals of eight output ports. For example, whereas "Do1-8" in FIG. 4 represent eight output ports "Do1"-"Do8", "Do1-8" is implemented by a single hardware "digital output port terminal".

The outputs "MIX1"-"MIX12" of the individual MIX output channels and the stereo outputs "ST_L" and "ST_R" of the stereo output channels are connected by the output patch section 30 to the analog output ports "Ao1"-"Ao24" and digital output ports "Do1"-"Do32", so that the output signals of the individual output channels are output via the output ports connected with the output channels. For example, the MIX output channel "MIX3" is connected to three output ports Ao5, Do4 and Do32.

A sound volume level control section 34 and delay control section 35 are provided for each of the analog output ports "Ao1"-"Ao24" and digital output ports "Do1"-"Do32". The sound volume level control section 34 and delay control section 35 corresponds to the output port parameters 31 of FIG. 2. Each of the sound volume level control sections 34 controls a sound volume level of an output signal of the corresponding output port on the basis of a corresponding parameter (third parameter of the output port), and each of the delay control sections 35 controls a delay amount of the output signal of the corresponding output port on the basis of a corresponding parameter (third parameter of the output port).

D/A converters ("D/A1"-"D/A24") 36 are provided in corresponding relation to the analog output ports "Ao1"-"Ao24". Each of the D/A converters 36 converts the output signal of the output channel into an analog audio signal, so that the converted analog audio signal is output via a corresponding one of the analog output ports "Ao1"-"Ao24". Further, one digital output section ("Digital Out") 37 is provided for the digital output ports "Do1"-"Do32". The digital output section 37 performs format conversion on the output signals of the output channels connected thereto and outputs each of the format-converted signals via any one of the terminals "Do1-8"-"Do25-32" corresponding to the digital output ports "Do1"-"Do32".

Namely, the plurality of output ports, comprising the output port parameters 31, A output section 32 and D output section 33, each input the audio signal supplied from the output channel connected thereto by the output patch section 30, control characteristics (e.g., sound volume level and delay amount) of the input signal on the basis of the output parameters (third parameters) stored in the current memory and then output the thus-controlled audio signal to the outside.

<Construction of Operation Panel>

Figure 5:
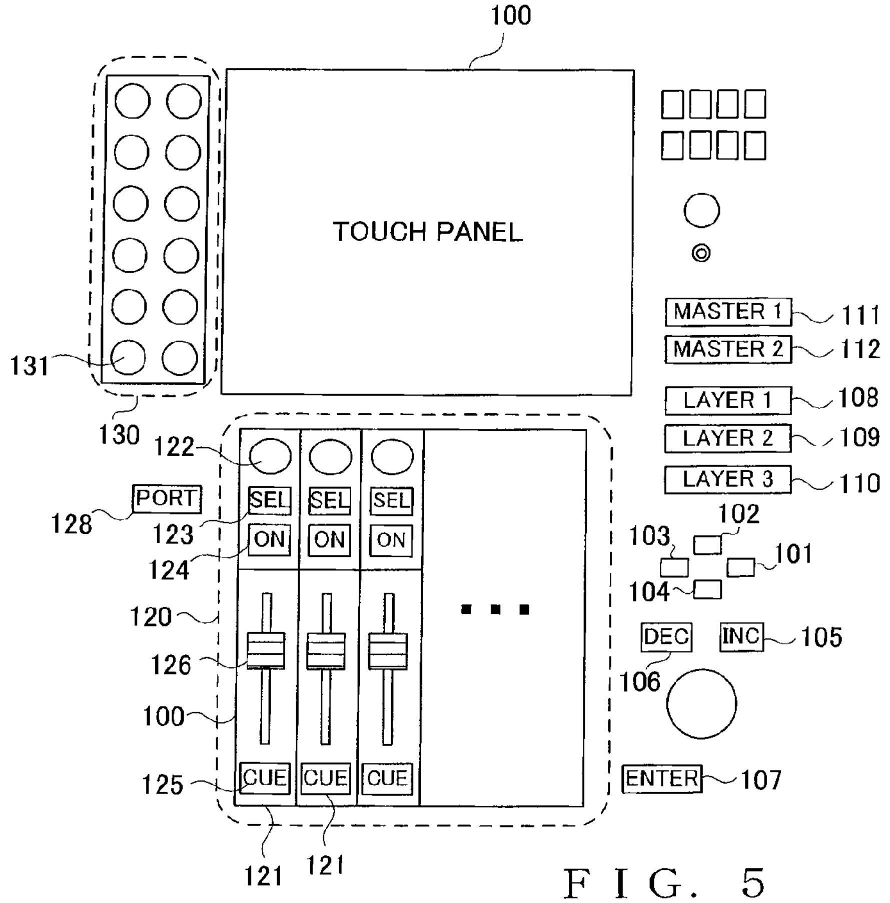
FIG. 5 is a plan view showing an example construction of an operation panel of the digital mixer shown in FIG. 1.

FIG. 5 shows an example construction of the operation panel 2, which generally comprises a touch panel 100, a channel strip section 120 and a send level setting section 130 that correspond to the control unit 3, electric fader group 4 and display device 5 shown in FIG. 1. Cursor keys 101 to 104 are operable to move a cursor in up-down and left-right directions on the touch panel 100. Increment and decrement keys 105 and 106 are operable to increase or decrease a numerical value or the like marked by the cursor. An ENTER key 107 is operable to confirm a numerical value, instruction or the like marked by the cursor.

Layers, each comprising eight channels, are allocated to layer selection keys 108-112. Any one of the layer selection keys 108-112 is selectively turned on by the human operator so that one layer corresponding to the turned-on key is selected as an object of display on a channel overview screen of the touch panel 100 and as an object of control via the channel strip section 120. The layers (layer 1, layer 2, layer 3, master 1 and master 2) are assigned respective unique layer numbers LN.

For example, input channels CHi1-CHi8 are allocated to "layer 1", input channels CHi9-CHi16 are allocated as "layer 2", input channels CHi17-CHi24 are allocated to "layer 3", MIX output channels MIX1-MIX6 are allocated to "master 1", and MIX output channels MIX1-MIX12 and ST channels are allocated to "master 2".

The channel strip section 120 comprises eight channel strips 121 arranged horizontally in parallel to one another. Eight input or output channels belonging to one layer selected via one of the layer selection keys 108-112 are allocated to the individual channel strips 121, and unique channel strip numbers (i) are assigned to the channel strips 121.

Each of the channel strips 121 includes a rotary encoder 122 to which is allocatable one parameter selected on the touch panel 100, a SEL key 123 for selecting, as a selected channel, the channel in question, a channel ON/OFF key 124 for switching between ON and OFF states of the channel, a CUE key 125 for selecting the channel as a cue-monitored channel, and a fader control 126 corresponding to the electric fader 4 of FIG. 1.

The send level setting section 130 includes 12 (twelve) rotary encoders 131 to which are allocated signal send (or delivery) levels from one channel (selected channel), selected by the SEL key 123 of the channel strip section 120, to buses. By operating one of the rotary encoders 131, the human operator can adjust the signal send level from the selected channel to a bus corresponding to the operated encoder 131.

On the touch panel 100, a channel overview screen 200 is displayed for displaying primary ones of parameters of the eight input or output channels belonging to one layer selected through operation of any one of the layer selection keys 108-112.

Figure 6A:
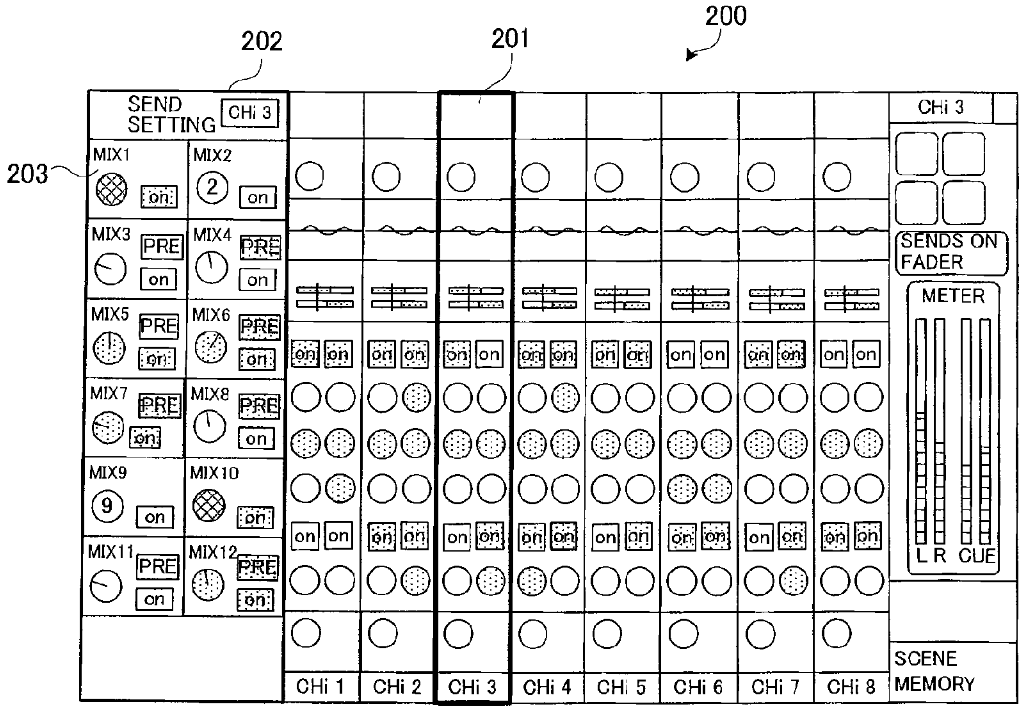
FIG. 6A is a diagram explanatory of an example configuration of a channel overview screen displayed on a touch panel display section provided on the operation panel shown in FIG. 3.

FIG. 6A shows an example configuration of the channel overview screen 200. More specifically, FIG. 6A shows a state where the layer comprising input channels CHi1-CHi8 is currently selected via one of the layer selection keys 108-112 and where input channel CHi3 is currently selected by the SEL key 123.

The channel overview screen 200 includes channel strip areas 201 arranged horizontally in parallel to one another in correspondence with the arrangement of the eight channel strips 121 of the channel strip section 120, and a send setting area 202 corresponding to the send level setting section 130.

In each of the channel strip areas 201 are displayed a plurality of GUI images indicative of parameters (hereinafter "parameter images") of the signal processing channel currently allocated to the corresponding channel strip 121, as well as output channel information, such as a channel name or channel number, identifying the allocated signal processing channel. In response to the cursor being moved to mark one of the parameters displayed in the channel strip area 201, the one parameter marked by the cursor is set as an object of control (i.e., object to be controlled) by the rotary encoder 122 of the channel strip 121 corresponding to the channel strip area 201. In FIG. 6A, parameters currently selected by the cursor are indicated by a thick-line frame. Also, in FIG. 6, shaded parameter images each indicate that a setting of the parameter in question is "OFF", while solid-white parameter images each indicate that a setting of the parameter in question is "ON".

In the channel strip area 201, that the corresponding channel is the currently selected channel ("CHi3" in the illustrated example) is clearly indicated by a particular display style (i.e., thick-line frame display in the illustrated example). In the send setting area 202, parameters related to setting of signal send (delivery) from the selected channel to individual buses is displayed for each of the buses. In an area 203 for displaying the parameter related to settings of signal send from the selected channel to one bus are displayed GUI images indicative of a bus send level, bus send ON/OFF and pre/post-fader signal switching. Individual blocks 203 of the send setting area 202 correspond to the 12 rotary encoders 131 of the send level setting section 130, and one of the parameters (typically, the bus send level) displayed in each of the blocks 203 is adjustable by the corresponding rotary encoder 131.

In the blocks 203, each parameter displayed by a shaded rectangular image indicates that the setting of the parameter is OFF, while each parameter displayed by a solid-white rectangular image indicates that the setting of the parameter is ON. Further, each cross-hatched circular image indicates that the bus in question is of a fixed type, while each solid-white circular image indicates that the bus in question is of a variable type. For each MIX bus whose bus type is the fixed type, the send level is fixed at a nominal level and used for grouped output of a pair of the MIX buses. In the illustrated example of FIG. 6A, the two mix buses "MIX1" and "MIX2" and the two mix buses "MIX9" and "MIX10" are pairs of the MIX buses set for grouped output.

<First Embodiment>

The operation panel 2 further includes a port setting key ("Port") 128 operable to display an "output channel-port setting popup screen" on the touch panel 100. The output channel-port setting popup screen displays a list of a plurality of output ports to which is connected an output channel selected by the SEL key 123 (i.e., selected output channel), output port information, such as output port names or output port numbers, identifying the listed output ports, and output port parameters 31 (see FIGS. 2 and 4) of the individual output ports. In response to the human operator operating the SEL key 123 while depressing the port setting key 128, the "output channel-port setting popup screen" is popup-displayed on the channel overview screen 200 shown in FIG. 6B. Thus, operation of the port setting key 128 is made valid only when the layer called out to the channel strip section 120 is of output type channels (i.e., MIX output channels 26, stereo output channels 27 or MATRIX output channels 29)

<Display of Output Channel-Port Setting Popup Screen>

Figure 7:
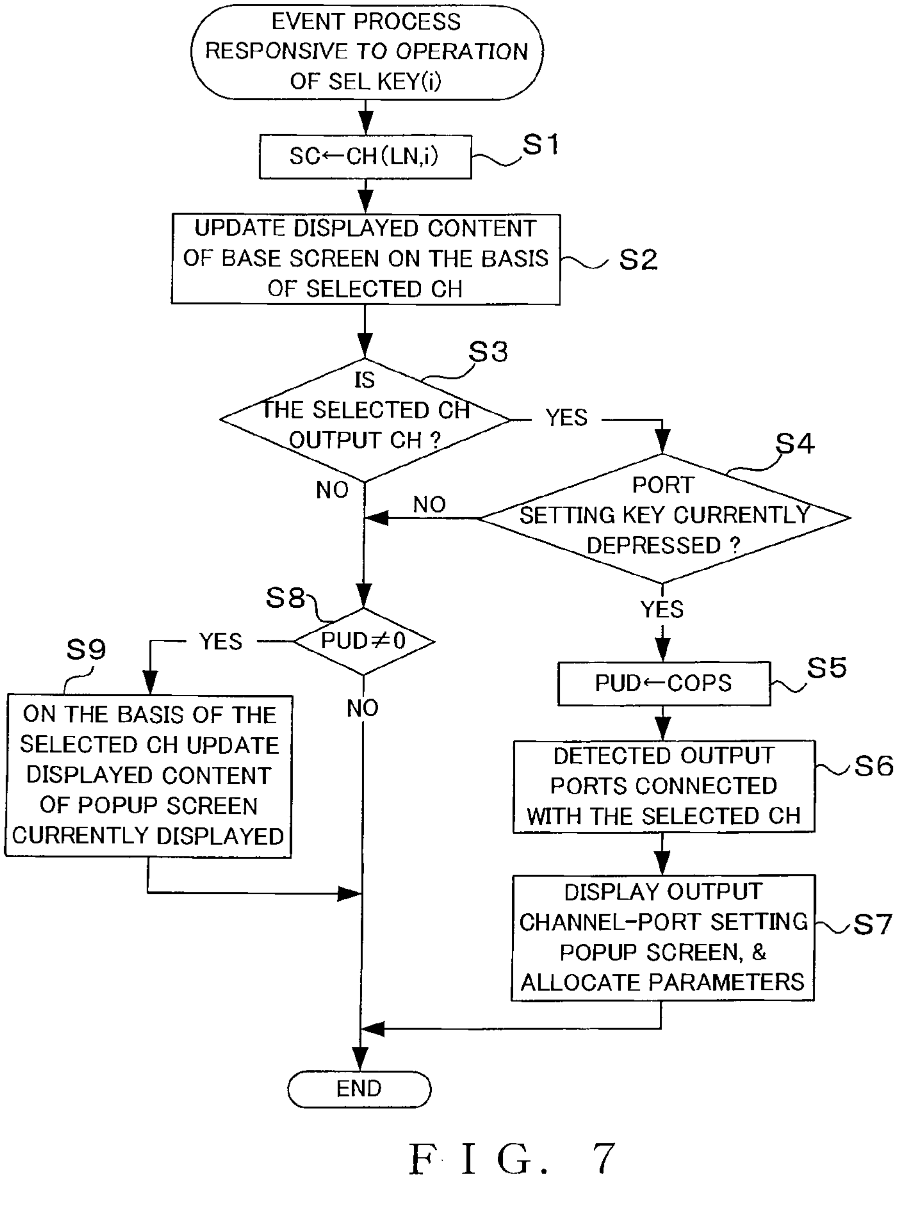
FIG. 7 is a flow chart explanatory of an event process performed in response to operation of a SEL key.

FIG. 7 is a flow chart explanatory of an event process performed by the CPU 10 in response to operation of the SEL key 123 of any one of the channel strips (i). At step S1, the CPU 10 sets channel identification information CH (LN, i)), identifying the signal processing channel corresponding to the operated SEL key 123, as a selected channel parameter SC. The channel identification information comprises the layer number (LN) of the layer which the channel in question belongs to, and the channel strip number (i) of the channel strip which the operated SEL key 123 belongs to. Any one channel can be identified by such a combination of a layer number (LN) and channel number (i).

At step S2, the CPU 10 updates displayed content of the base screen (channel overview screen 200) on the basis of a selected channel ("CH" in the figure) (SC_ch). Thus, the channel strip area 201 corresponding to the operated SEL key 123 is displayed in a thick-line frame, and parameters related to settings of signal send (or delivery) from the selected channel (SC_ch) to individual buses are displayed in the send setting area 202.

At next step S3, the CPU 10 determines whether the selected channel (channel is indicated by "CH" in the flow chart) (SC_ch) is an output type channel, such as a MIX output channel 26, stereo (ST) output channel 27 or MATRIX output channel 29. If the selected channel (SC_ch) is an output type channel (YES determination at step S3) and if the port setting key 128 is currently being depressed (YES determination at step S4), the CPU 10 goes to step S5 to set a value "COPS", indicative of an output channel-port setting popup screen, as a popup screen parameter PUD indicative of a current display state (i.e., presence/absence of display) and screen type of a popup screen, and then goes to step S6 to detect, on the basis of patch setting data stored in the current memory, a plurality of output ports connected with the selected output channel ("CH") (SC_ch).

At following step S7, the CPU 10 popup-displays, on the channel overview screen 200, the output channel-port setting popup screen 300 for indicating the plurality of output ports detected at step S6, as well as output port information, such as output port names and numbers, identifying the output ports connected with the selected output channel (SC_ch). Further, the CPU 10 allocates output port parameters (reference numeral 31 of FIG. 2 and reference numerals 34 and 35 of FIG. 4) of the connected output ports to the corresponding channel strips 121 of the channel strip section 120. Thus, the output channel-port setting popup screen 300 indicating the plurality of output ports connected to the selected channel (SC_ch) is displayed on the touch panel 100.

If the port setting key 128 is not currently being depressed (NO determination at step S4), the CPU 10, or if the selected channel (SC_ch) is not an output type channel (NO determination at step S3), the CPU 10 goes to step S8, where it further determines, on the basis of the value of the popup screen parameter PUD, whether any other popup screen is currently being displayed. If the value of the popup screen parameter PUD is not "0" (PUD≠0) (YES determination at step S8), it means that some popup screen corresponding to the value of the popup screen parameter PUD is currently being displayed. In this case, the CPU 10 goes to step S9, where it updates the displayed content of the currently displayed popup screen on the basis of the selected channel parameter SC. Examples of the "other popup screen" include an equalizer setting screen, an effecter setting screen, etc. If no popup screen is currently being displayed (PUD=0) (NO determination at step S8), the CPU 10 terminates the current event process.

Figure 6B:
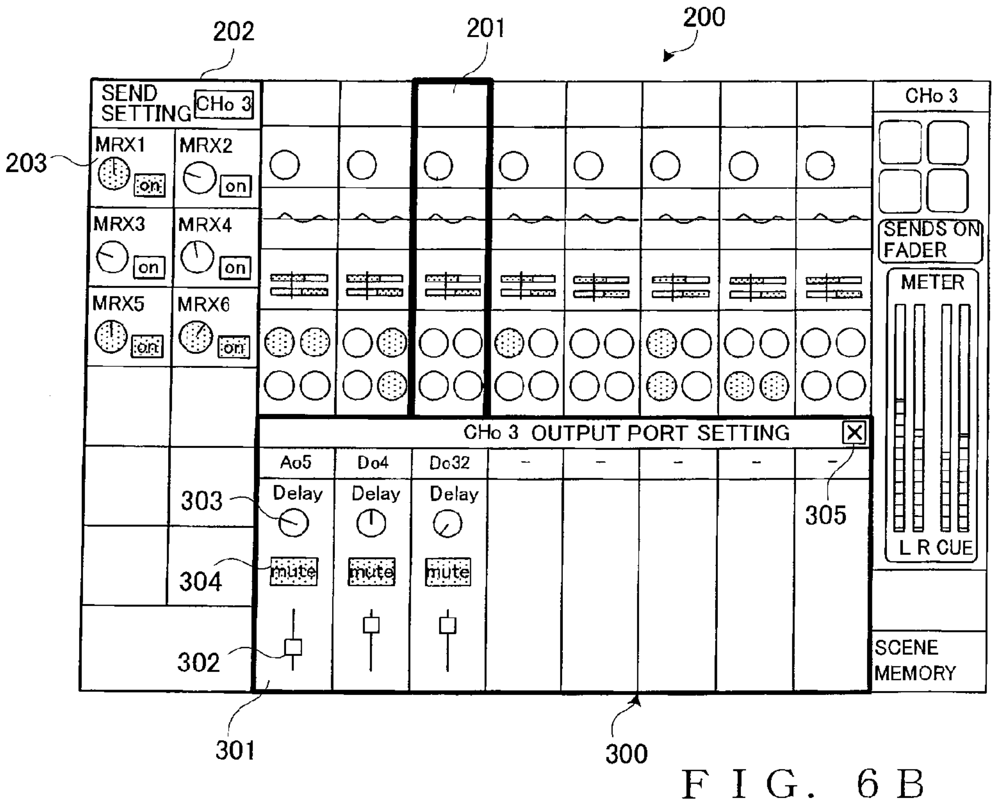
FIG. 6B shows a state where an output channel-port setting popup screen is displayed on the screen of FIG. 6A.

FIG. 6B shows an example configuration of the output channel-port setting popup screen 300. The output channel-port setting popup screen 300 is displayed superposed on the eight channel strip areas 201 with its lower end edge positionally aligned with the lower end edge of the channel overview screen 200. The illustrated example of FIG. 6B shows a state where a layer of output type channels (MIX output channels) is currently selected and where the MIX output channel (Cho3) allocated to the third channel strip area 201 from the left is currently selected as the selected channel (SC_ch).

On the output channel-port setting popup screen 300, a plurality of output ports connected to the selected channel (SC_ch) are allocated to eight output port setting areas 301, arranged in correspondence with the arrangement of the channel strips 121, one output port per output port setting area 301. In the illustrated example of FIG. 6B, three output ports (analog output Ao5, digital output Do4 and digital output Do32) connected to the MIX output channel (Cho3) are allocated to the output port setting areas 301. In this case, the output ports are allocated to only three of the output port setting areas 301 with the remaining five output port setting areas 301 left unallocated or blank.

The output port setting areas 301 are displayed output port information, such as output port names and numbers, identifying the allocated output ports (letter string "Ao5", "Do4" and "Do32" in the illustrated example), as well as sound volume levels 302, delay parameters 303 and mute ON/OFF settings of the output ports. These parameters 302, 303 and 304 of the output ports are displayed on the basis of the corresponding parameters of the current memory and in display styles corresponding to the settings of the parameters. Current values of the sound volume level 302 are indicated by current positions of knob images, current delay amounts of the delay parameter 303 are indicated by rotational angles of knob images, and current ON/OFF settings of the mute ON/OFF setting 304 are indicated by a solid-white image and a shaded image, respectively.

The output port parameters displayed in the output port setting areas 301 are allocated to the channel strips 121 corresponding to the output port setting areas 301. In each of such channel strips 121, for example, the sound volume level 302 is allocated to the fader control 126, the delay parameter 303 to the rotary encoder 122, and the mute ON/OFF setting 304 to the channel ON/OFF key 124. Thus, while the output channel-port setting popup screen 300 is being displayed, the output port parameters of the plurality of output ports to which the selected output channel is connected can be controlled individually for each of the output ports.

Note that operation on the channel strip 121 corresponding to any one of the output port setting areas 301 which has no output port allocated thereto (i.e., blank output port setting area 301) is made invalid while the output channel-port setting popup screen 300 is being displayed.

<Event Process Responsive to Operation of Fader Control>

Figure 8:
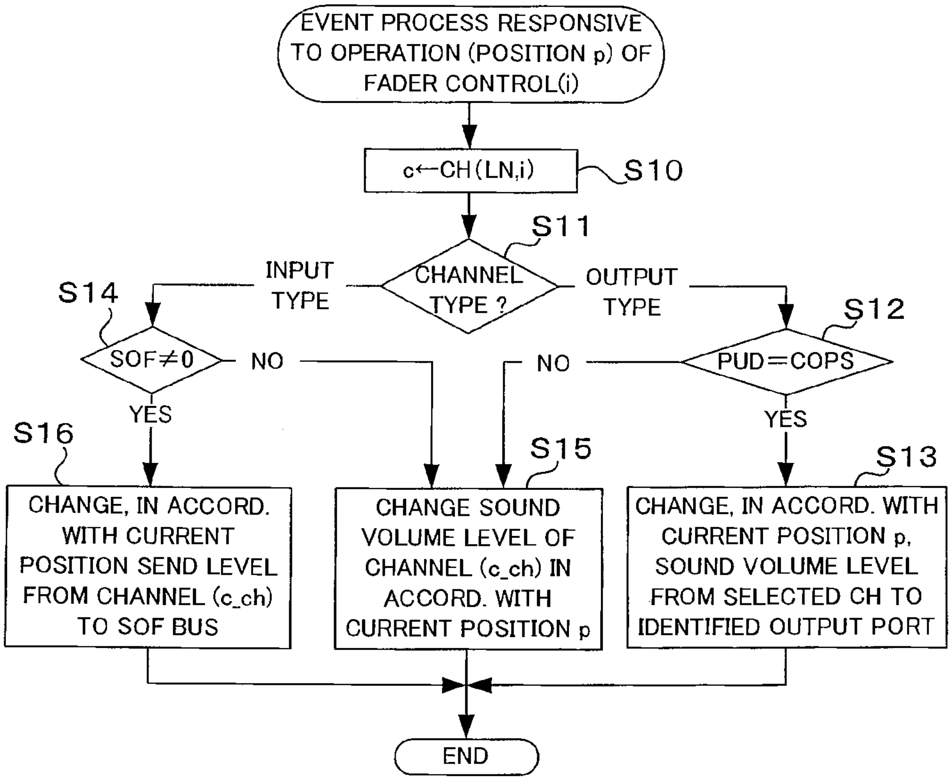
FIG. 8 is a flow chart explanatory of an event process performed in response to operation of a fader control.

FIG. 8 is a flow chart explanatory of an event process performed by the CPU 10 in response to operation of the fader control 126 of any one of the channel strips (i). The CPU 10 detects a knob position p having been changed in response to operation of the fader control 126(*i*). At step S10, the CPU 10 sets, as a to-be-controlled channel parameter c (hereinafter also referred to as "object-of-control parameter c"), information CH(LN, i) identifying the channel corresponding to the operated fader control 126. At nest step S11, the CPU 10 determines whether the to-be-controlled channel (hereinafter also referred to as "object-of-control channel") (c_ch) is an input type channel or an output type channel.

If the object-of-control channel (c_ch) is an output type channel (determination result "output type channel" at step S11), the CPU 10 goes to step S12 to further determine, on the basis of a value of the popup screen parameter PUD, whether the output channel-port setting popup screen is currently being displayed. With a YES determination at step S12, the CPU 10 identifies, on the basis of the channel strip number (i) of the object-of-control channel (c_ch), an output port allocated to the output port setting area 301 corresponding to the channel strip (i), and then changes a sound volume level of a signal to be send from the currently selected output channel (SC_ch) to the identified output port (i.e., value of the sound volume level control portion 34) (step S13).

If the output channel-port setting popup screen is not currently being displayed (NO determination at step S12) even though the object-of-control channel (c_ch) is an output type channel, or if the object-of-control channel (c_ch) is an input-type channel (determination result "input type channel" at step S11) and a fader mode of the object-of-control channel (c_ch) is a normal mode (SOF=0) (NO determination at step S14), the CPU 10 changes the value of the sound volume level of the object-of-control channel (c_ch) in accordance with a currently detected knob position p, at step S15.

If the object-of-control channel (c_ch) is an input-type channel (determination result "input type channel" at step S11) and the fader mode of the object-of-control channel (c_ch) is a send-ON fader mode (SOF≠0) (YES determination at step S14), the CPU 10 changes, in accordance with the currently detected knob position p, a send level value of a signal to be sent from the object-of-control channel (c_ch) to a bus set as an object of SOF (hereinafter "object-of-SOF bus"), at step S16.

<Event Process Responsive to Operation of Encoder>

Figure 9:
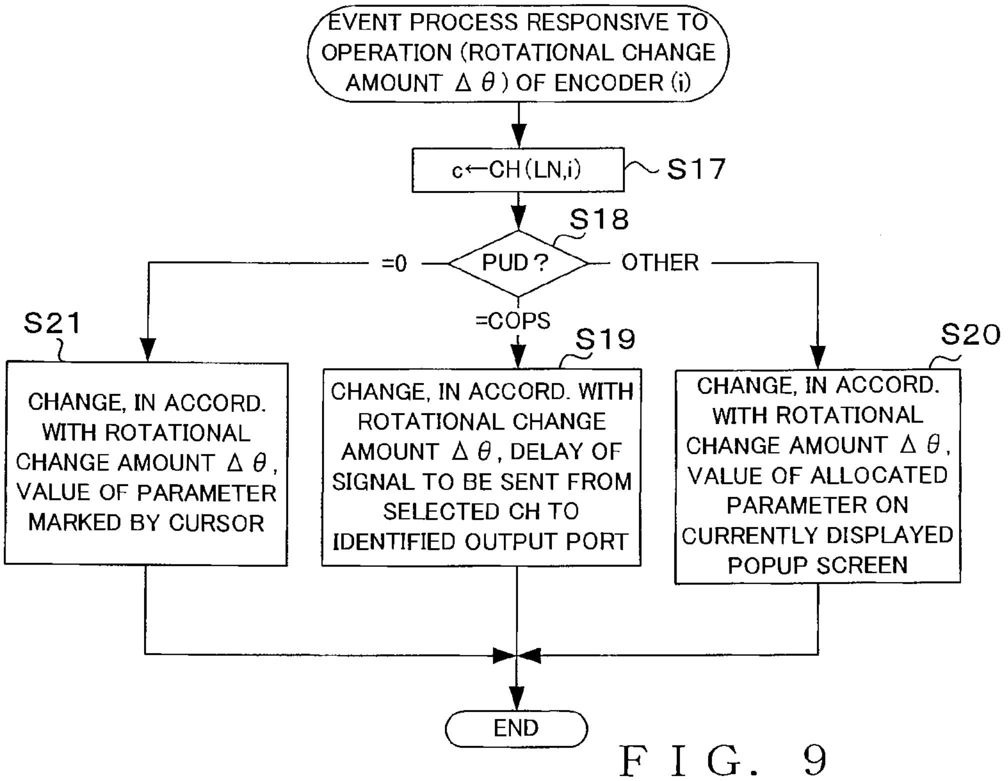
FIG. 9 is a flow chart explanatory of an event process performed in response to operation of a rotary encoder.

FIG. 9 is a flow chart explanatory of an event process performed by the CPU 10 in response to operation of the rotary encoder 122 of any one of the channel strips (i). The CPU 10 detects a rotational change amount Δθ responsive to the operation of the rotary encoder 122. At step S17, the CPU 10 sets, as the object-of-control parameter t c, information CH(LN, i) identifying the channel corresponding to the operated rotary encoder 122. At next step S18, the CPU 10 determines, on the basis of the value of the PUD, presence/absence of display and screen type of a popup screen.

If the output channel-port setting popup screen is currently being displayed (determination result "PUD=COPS" at step S18), the CPU 10 identifies, on the basis of the channel strip number (i) of the object-of-control channel (c_ch), the output port allocated to the output port setting area 301 corresponding to the channel strip number (i), and then changes an amount of delay of a signal to be sent from the selected output channel (SC_ch) to the identified output port (i.e., value of the delay control portion 35) in accordance with the currently detected rotational change amount Δθ, at step S19.

If another popup screen than the output channel-port setting popup screen is currently being displayed (determination result "Other" at step S18), the CPU 10 goes to step S20, where it changes a value of a parameter, allocated to the encoder 122(*i*) on the currently displayed popup screen, in accordance with the currently detected rotational change amount Δθ of the encoder 122(*i*).

Further, if no popup screen is currently being displayed (determination result "PUD=0" at step S18), the CPU 10 proceeds to step S21, where it changes a value of a parameter, marked by the cursor in the channel strip area 201 of the object-of-control channel (c_ch) (i.e., parameter allocated to the encoder 122(*i*)), in accordance with the currently detected rotational change amount Δθ.

Further, once the channel ON/OFF key 124(*i*) is operated, the CPU 10 acquires a value (i.e., ON or OFF) of the operated channel ON/OFF key 124(*i*). and sets, as the object-of-control parameter c, information CH(LN, i) identifying the channel corresponding to the operated channel ON/OFF key 124(*i*). If the object-of-control channel (c_ch) is an output type channel and the output channel-port setting popup screen is currently being displayed ("PUD=COPS"), identifies, on the basis of the channel strip number (i) of the object-of-control channel (c_ch), the output port allocated to the output port setting area 301 corresponding to the channel strip number (i), and then performs mute control for shutting off signal send from the current selected output channel (SC_ch) to the identified output port. In the mute control, the CPU 10 mutes the output signal of the output port by setting the sound volume level of the output port to −∞ irrespective of the value of the sound volume level control portion 34 of the output port. If the object-of-control channel (c_ch) is an input type channel or if no popup screen is currently being displayed, the signal output from the object-of-control channel (c_ch) is turned on or off in response to the operation of the channel ON/OFF key 124(*i*) as usual.

The output channel-port setting popup screen 300 is closed in response to operation of a popup screen end button 305 displayed at a right upper corner of the screen 300. After the closing of the output channel-port setting popup screen 300, the individual channel strips 121 are allocated parameters of the corresponding output channels.

According to the above-described embodiment of the present invention, once the human operator selects one output channel using the port setting key 128 and SEL key 123, output parameters of a plurality of output ports connected with the selected output channel (SC_ch) are displayed in a given arrangement on the output channel-port setting popup screen 300, so that each of the thus-displayed output parameters can be adjusted via the corresponding channel strip 121. Thus, the first embodiment advantageously allows the human operator to make settings of output port parameters of a plurality of output ports, which function as output destinations of a particular one of the output channels, using a group of controls provided in the channel strip section 120.

Note that operation, by the human operator, of the channel strip 121 corresponding to the blank output port setting area 301 having no output port allocated thereto need not necessarily be made invalid. Namely, the first embodiment may be constructed in such a manner that content of the base screen (channel overview screen 200) can be controlled in accordance with human operator's operation of the blank output port setting area 301.

Further, whereas the first embodiment has been described above in relation to the case where the "output channel-port setting popup screen" is displayed in response to the human operator operating any one of the SEL keys 123 while simultaneously depressing the port setting key 128 (i.e, where human operator's operation of any one of the SEL keys 123 during depression of the port setting key 128 triggers the display of the "output channel-port setting popup screen"), the first embodiment may be modified in such a manner that the "output channel-port setting popup screen" is displayed, in response to operation of the port setting key 128, for an output channel currently selected by the SEL key 123.

<Second Embodiment>

Figure 10:
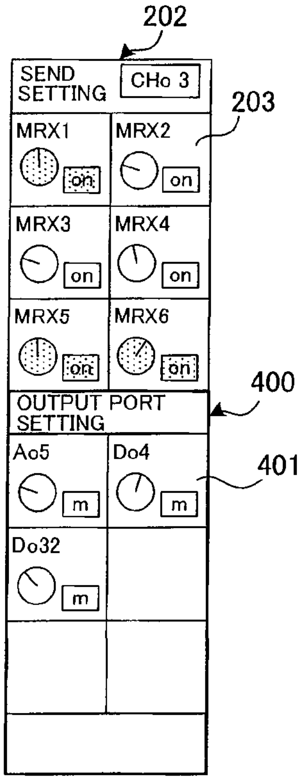
FIG. 10 is a diagram showing another example of an output port setting display.

The output channel-port setting section may be displayed in the send setting area 202. When the selected channel is the MIX output channel (CHo3) shown in FIG. 6B, parameters related to setting of signal send from the MIX output channel (CHo3) to the six MATRIX buses are displayed in six of the areas 203 with the remaining six areas 203 left blank. FIG. 10 shows an example construction where the output channel-port setting section 400 is displayed in the send setting area 202. The output channel-port setting section 400 includes six regions 401 provided in an arrangement corresponding to that of predetermined six rotary encoders 131 of the send level setting section 130. The individual regions 401 are allocated output ports connected with the selected output channel (CHo3), and output port information, such as the output port numbers and output port names, identifying the allocated output ports (letter strings "Ao5", "Do4" and "Do32") and output port parameters (reference numeral 31 of FIG. 2 and reference numerals 34 and 35 of FIG. 4) of the output ports are displayed in the regions 401 of the output channel-port setting section 400. In this case, the parameters displayed in the regions 401 are allocated to the rotary encoders 131 corresponding to the regions 401.

Thus, as long as the selected channel is an output channel (CHo3), the above arrangements of the second embodiment allow the output channel-port setting section 400 to be always displayed in the send setting area 202. Therefore, the second embodiment can dispense with not only the port setting key 128 but also the operation for popup-displaying the output channel port setting screen. The following briefly describe processing performed by the CPU 10 for displaying the output channel-port setting section 400. If the selected channel (SC_ch) is an output channel, and when a selected channel (SC_ch) is to be set in response to operation of any one of the SEL keys 123(*i*) (step S1 of FIG. 7) and the displayed content of the base screen (channel overview screen) is to be updated on the basis of the thus-set selected channel (SC_ch) (step S2 of FIG. 7), the CPU 10 not only displays, in the send setting area 202, the output channel-port setting section 400 for the selected channel (SC_ch) as one of updated content but also allocates output port parameters 31 of individual output ports, connected with the selected channel (SC_ch), to the rotary encoders 131 corresponding to the regions 401.

According to the above-described second embodiment of the present invention, once the human operator selects one output channel by operating the SEL key 123, a plurality of output ports connected with the selected output channel (SC_ch) are displayed in a given arrangement in the output channel-port setting portion 400 within the send setting area 202, so that output parameters of each of the output ports can be adjusted via the corresponding rotary encoder 131. Thus, the second embodiment advantageously allows the human operator to efficiently make settings of the output port parameters of the plurality of output ports, which function as output destinations of a particular output channel, using a group of controls provided in the send level setting section 130.

Note that, as a modification of the construction for always displaying the output channel-port setting portion 400 in the send setting area 202, the second embodiment may be constructed to allow the human operator to select, as content to be displayed in the send setting area 202, any one of the section (areas 203) for sending a signal to a MATRIX bus and the output channel-port setting section 400.

Whereas the embodiments have been described as constructed as controlling parameters provided in signal paths from the output channel to the output ports on an output-port-by-output-port basis, the present invention is applicable to a case where parameters provided in signal paths from the input ports to the input channels are to be controlled on an input-port-by-input-port basis.

It should be appreciated that the mixer 1, to which the basic principles of the present invention are applied, may be constructed as an apparatus where the operation panel 2, waveform I/O 6 and DSP section 7 are accommodated in a single casing, or as a mixing system where the components functionally independent of one another are interconnected via a network.

This application is based on, and claims priority to, JP PA 2010-065105 filed on 19 Mar. 2010. The disclosure of the priority application, in its entirety, including the drawings, claims, and the specification thereof, are incorporated herein by reference.

What is claimed is:

1. A digital mixer including a plurality of output channels, a plurality of output ports and an output patch section, said digital mixer comprising:

a storage section which stores a plurality of parameters including first parameters of individual ones of the output channels, second parameters of the output patch section and third parameters of individual ones of the output ports;

a connection change section which changes one of the second parameters, stored in said storage section, in response to connection change operation by a human operator;

a plurality of n controls;

an output channel selection section which, in response to output channel selection operation by a human operator, selects one of the plurality of output channels;

a parameter allocation section which, once one of the output channels is selected by said output channel selection section, detects one or more said output ports connected to the selected one output channel on the basis of the second parameters, and allocates one or more said third parameters, of the detected one or more output ports to one or more of the n controls;

a parameter change section which, in response to operation by a human operator of one of the n controls, changes a value of the third parameter allocated to the one control by said parameter allocation section from among the plurality of parameters stored in said storage section;

said plurality of output channels, each of which receives a supplied audio signal as input, controls a characteristic of the channel-received audio signal on the basis of one of the first parameters stored in said storage section and outputs the channel-controlled audio signal;

said output patch section which, in accordance with connections between said plurality of output channels and said plurality of output ports indicated by the second parameters stored in said storage section, supplies an audio signal, outputted from each of the output channels, to one or more said output ports connected with the respective output channel; and said plurality of output ports, each of which receives an audio signal supplied by the output patch section, controls a characteristic of the port-received audio signal on the basis of one of the third parameters stored in said storage section and outputs the port-controlled audio signal to outside the mixer.

2. The digital mixer as claimed in claim 1, wherein said parameter allocation section further displays on a display device one or more said third parameters of the detected one or more output ports.

3. A digital mixer including a plurality of output channels, a plurality of output ports and an output patch section, said digital mixer comprising:

a storage section which stores a plurality of parameters including first parameters of individual ones of the output channels, second parameters of the output patch section and third parameters of individual ones of the output ports;

a connection change section which changes one of the second parameters, stored in said storage section, in response to connection change operation by a human operator;

a plurality of n controls;

a layer selection section which, in response to layer selection operation by a human operator, selects one of a plurality of layers each comprising plural n output channels of said plurality of output channels;

an output channel selection section which, in response to output channel selection operation by a human operator, selects one of the plurality of output channels;

a parameter allocation section which, once one of the layers is selected by said layer selection section, allocates n said first parameters of the n output channels to the n controls, and which, once one of the output channels is selected by said output channel selection section, detects one or more said output ports connected to the selected one output channel on the basis of the second parameters, and allocates one or more said third parameters of the detected one or more output ports to one or more of the n controls;

a parameter change section which, in response to operation by a human operator of one of the n controls, changes a value of the third parameter allocated to the one control by said parameter allocation section from among the plurality of parameters stored in said storage section;

said plurality of output channels, each of which receives a supplied audio signal as input, controls a characteristic of the channel-received audio signal on the basis of one of the first parameters stored in said storage section and outputs the channel-controlled audio signal;

said output patch section which, in accordance with connections between said plurality of output channels and said plurality of output ports indicated by the second parameters stored in said storage section, supplies an audio signal, outputted from each of the output channels, to one or more said output ports connected with the respective output channel; and said plurality of output ports, each of which receives an audio signal supplied by the output patch section, controls a characteristic of the port-received audio signal on the basis of one of the third parameters stored in said storage section and outputs the port-controlled audio signal to outside the mixer.

4. The digital mixer as claimed in claim 3, wherein said parameter allocation section further displays on a display device one or more said third parameters of the detected one or more output ports.

5. The digital mixer as claimed in claim 1, wherein said parameter allocation section is adapted to display on a display device output port information indicative of the detected one or more output ports.

6. The digital mixer as claimed in claim 3, wherein said parameter allocation section is adapted to, once one of the layers is selected by said layer selection section, display on a display device output channel information indicative of the n output channels belonging to the one selected layer, and said parameter allocation section is further adapted to, once one of the output channels is selected by said output channel selection section, display on the display device output port information indicative of the detected one or more output ports.

7. A digital mixer including a plurality of output channels, a plurality of output ports and an output patch section, said digital mixer comprising:

a plurality of n controls;

a memory configured to store a plurality of parameters including first parameters of individual ones of the output channels, second parameters of the output patch section and third parameters of individual ones of the output ports; and a processor configured to:

change one of the second parameters, stored in said memory, in response to connection change operation by a human operator;

in response to output channel selection operation by a human operator, select one of the plurality of output channels;

in response to the selection of the selected one output channel, detect one or more said output ports connected to the selected one output channel on the basis of the second parameters, and allocate one or more said third parameters of the detected one or more output ports to one or more of the n controls; and in response to operation by a human operator of one of the n controls, change a value of the third parameter allocated to the one control from among the plurality of parameters stored in said memory.

8. The digital mixer as claimed in claim 7, wherein each of said plurality of output channels is configured to receive a supplied audio signal as input, control a characteristic of the channel-received audio signal on the basis of one of the first parameters stored in said memory and output the channel-controlled audio signal;

said output patch section is configured to, in accordance with connections between said plurality of output channels and said plurality of output ports indicated by the second parameters stored in said memory, supply an audio signal, outputted from each of the output channels, to one or more said output ports connected with the respective output channel; and each of said plurality of output ports is configured to receive an audio signal supplied by the output patch section, control a characteristic of the port-received audio signal on the basis of one of the third parameters stored in said memory and output the port-controlled audio signal to outside the mixer.

9. The digital mixer as claimed in claim 7, wherein said processor is further configured to display on a display device output port information indicative of the detected one or more output ports.

10. A digital mixer including a plurality of output channels, a plurality of output ports and an output patch section, said digital mixer comprising:

a plurality of n controls;

a memory configured to store a plurality of parameters including first parameters of individual ones of the output channels, second parameters of the output patch section and third parameters of individual ones of the output ports; and a processor configured to:

change one of the second parameters, stored in said memory, in response to connection change operation by a human operator;

in response to layer selection operation by a human operator, select one of a plurality of layers each comprising plural n output channels of said plurality of output channels;

in response to output channel selection operation by a human operator, select one of the plurality of output channels;

in response to the selection of the selected one layer, allocate n said first parameters of the n output channels to the n controls;

in response to the selection of the selected one output channel, detect one or more said output ports connected to the selected one output channel on the basis of the second parameters, and allocate one or more said third parameters of the detected one or more output ports to one or more of the n controls; and in response to operation by a human operator of one of the n controls, change a value of the third parameter allocated to the one control from among the plurality of parameters stored in said memory.

11. The digital mixer as claimed in claim 10, wherein each of said plurality of output channels is configured to receive a supplied audio signal as input, controls a characteristic of the channel-received audio signal on the basis of one of the first parameters stored in said memory and output the channel-controlled audio signal;

said output patch section is configured to, in accordance with connections between said plurality of output channels and said plurality of output ports indicated by the second parameters stored in said memory, supply an audio signal, outputted from each of the output channels, to one or more said output ports connected with the respective output channel; and each of said plurality of output ports is configured to receive an audio signal supplied by the output patch section, control a characteristic of the port-received audio signal on the basis one of the third parameters stored in said memory and output the port-controlled audio signal to outside the mixer.

12. The digital mixer as claimed in claim 10, wherein said processor is further configured to display on a display device output channel information indicative of the n output channels belonging to the selected one layer, and said processor is further configured to display on the display device output port information indicative of the detected one or more output ports.

* * * * *